United States Patent
Sakurada et al.

(10) Patent No.: US 11,948,457 B2
(45) Date of Patent: *Apr. 2, 2024

(54) INFORMATION PROCESSING DEVICE, INFORMATION PROCESSING SYSTEM, INFORMATION PROCESSING METHOD, AND VEHICLE

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 48 days.

This patent is subject to a terminal disclaimer.

(21) Appl. No.: 17/666,697

(22) Filed: Feb. 8, 2022

(65) Prior Publication Data
US 2022/0319316 A1    Oct. 6, 2022

(30) Foreign Application Priority Data
Mar. 30, 2021    (JP) ................... 2021-058025

(51) Int. Cl.
*G08G 1/0967* (2006.01)
*G08G 1/005* (2006.01)
*B60K 35/00* (2006.01)

(52) U.S. Cl.
CPC ....... *G08G 1/096783* (2013.01); *G08G 1/005* (2013.01); *B60K 35/00* (2013.01); *B60K 2370/178* (2019.05); *B60K 2370/179* (2019.05); *B60K 2370/191* (2019.05); *B60K 2370/31* (2019.05)

(58) Field of Classification Search
CPC ............ G08G 1/096783; G08G 1/005; B60K 2370/31; B60K 2370/178; B60K 2370/191; B60K 2370/179; B60K 35/00
See application file for complete search history.

(56) References Cited

U.S. PATENT DOCUMENTS

| 5,734,339 | A | * | 3/1998 | Ogle | ...................... | G08G 1/005 |
| | | | | | | 340/925 |
| 6,384,742 | B1 | * | 5/2002 | Harrison | ................. | E01F 9/559 |
| | | | | | | 340/925 |
| 10,272,830 | B2 | * | 4/2019 | Suzuki | ................... | B60Q 1/547 |

(Continued)

FOREIGN PATENT DOCUMENTS

| CN | 206388322 U | 8/2017 |
| CN | 208156864 U | 11/2018 |

(Continued)

OTHER PUBLICATIONS

Mar. 30, 2023 Office Action issued in U.S. Appl. No. 17/559,932.
Jul. 12, 2023 Notice of Allowance issued in U.S. Appl. No. 17/559,932.

*Primary Examiner* — Chico A Foxx
(74) *Attorney, Agent, or Firm* — Oliff PLC

(57) ABSTRACT

An information processing device includes a controller configured to control display of a crosswalk on a road on which a vehicle travels. The controller outputs information to be displayed on a display device such that a driver of the vehicle visually recognizes advance notification information that makes advance notification of the display of the crosswalk.

18 Claims, 8 Drawing Sheets

(56) References Cited

U.S. PATENT DOCUMENTS

| | | | |
|---|---|---|---|
| 10,733,893 B1 | 8/2020 | Swan | |
| 10,981,507 B1* | 4/2021 | Benjamin | H04N 23/90 |
| 11,017,661 B1* | 5/2021 | Beauchamp | H04W 4/44 |
| 2005/0104747 A1* | 5/2005 | Silic | G08G 1/005 340/944 |
| 2005/0270175 A1* | 12/2005 | Peddie | G08G 1/096783 246/473 R |
| 2009/0091474 A1* | 4/2009 | Konforty | G08G 1/095 340/907 |
| 2010/0102991 A1* | 4/2010 | Hernandez Gonzalez | G08G 1/005 340/944 |
| 2014/0285364 A1* | 9/2014 | Chen | G08G 1/167 340/988 |
| 2015/0084791 A1* | 3/2015 | Jang | G08G 1/07 340/944 |
| 2016/0148511 A1* | 5/2016 | Shibata | G08G 1/166 701/119 |
| 2017/0301268 A1 | 10/2017 | Laforce et al. | |
| 2018/0075748 A1* | 3/2018 | Park | B60W 30/08 |
| 2018/0118099 A1* | 5/2018 | Kunii | B60Q 1/38 |
| 2019/0031198 A1* | 1/2019 | Aoki | G06V 10/25 |
| 2019/0035262 A1* | 1/2019 | Brady | G08G 1/005 |
| 2019/0088112 A1* | 3/2019 | Jung | G08G 1/166 |
| 2019/0139414 A1* | 5/2019 | Morimura | G08G 1/005 |
| 2019/0193626 A1* | 6/2019 | Park | B60W 40/105 |
| 2019/0287403 A1 | 9/2019 | Aoude et al. | |
| 2020/0198534 A1 | 6/2020 | Ito et al. | |
| 2020/0265719 A1 | 8/2020 | Swan | |
| 2021/0182576 A1* | 6/2021 | Kuriyama | G06V 20/588 |
| 2021/0256933 A1* | 8/2021 | Kurebayashi | G06F 3/013 |
| 2021/0316750 A1* | 10/2021 | Jo | B60W 60/001 |
| 2022/0258758 A1* | 8/2022 | Fujimoto | B60Q 1/5037 |
| 2022/0270475 A1* | 8/2022 | Sakurada | G06V 20/20 |
| 2022/0379806 A1* | 12/2022 | Spoor | B60Q 1/545 |

FOREIGN PATENT DOCUMENTS

| | | | |
|---|---|---|---|
| CN | 110264754 A | 9/2019 | |
| CN | 210777188 U | 6/2020 | |
| CN | 111462474 A | 7/2020 | |
| CN | 111806340 A | 10/2020 | |
| JP | 2014-225151 A | 12/2014 | |
| JP | 2020-097366 A | 6/2020 | |
| WO | WO-2008119857 A1 * | 10/2008 | G08G 1/005 |
| WO | WO-2015012749 A1 * | 1/2015 | G08G 1/07 |

* cited by examiner

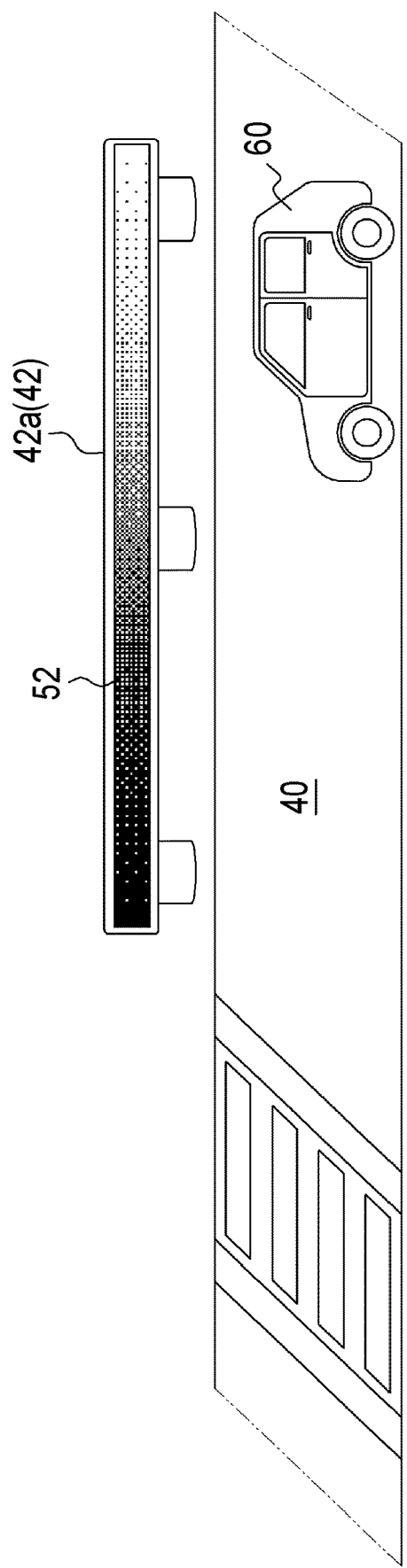

INFORMATION PROCESSING DEVICE, INFORMATION PROCESSING SYSTEM, INFORMATION PROCESSING METHOD, AND VEHICLE

CROSS-REFERENCE TO RELATED APPLICATION

This application claims priority to Japanese Patent Application No. 2021-058025 filed on Mar. 30, 2021, incorporated herein by reference in its entirety.

BACKGROUND

1. Technical Field

The present disclosure relates to an information processing device, an information processing system, an information processing method, and a vehicle.

2. Description of Related Art

In the related art, there is known a configuration in which when a pedestrian starts to cross a predetermined place on a road, a peripheral vehicle is notified that the pedestrian is present (refer to, for example, Japanese Unexamined Patent Application Publication No. 2014-225151).

SUMMARY

In a system in which a crosswalk is not normally displayed on the road and the crosswalk is displayed solely when the pedestrian crosses, the crosswalk suddenly appears from the viewpoint of a vehicle driver. The sudden appearance of the crosswalk may hinder driving of the vehicle.

The present disclosure is to reduce a possibility of hindering driving of a vehicle when a crosswalk is displayed.

An aspect of the disclosure relates to an information processing device including a controller configured to control display of a crosswalk on a road on which a vehicle travels. The controller outputs information to be displayed on a display device such that a driver of the vehicle visually recognizes advance notification information that makes advance notification of the display of the crosswalk.

An aspect of the disclosure relates to an information processing system including the information processing device and the display device.

An aspect of the disclosure relates to an information processing method that controls display of a crosswalk on a road on which a vehicle travels. The information processing method includes outputting information to be displayed on a display device such that a driver of the vehicle visually recognizes advance notification information that makes advance notification of the display of the crosswalk.

An aspect of the disclosure relates to a vehicle equipped with a display device that displays advance notification information as a virtual image such that the advance notification information that makes advance notification of the display of a crosswalk on a road is superimposed on at least one of a road surface of the road and a road structure located on a side of the road, viewed from a driver.

According to the information processing device, the information processing system, the information processing method, and the vehicle according to the embodiment of the present disclosure, the possibility that the driving of the vehicle is hindered when the crosswalk is displayed may be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a diagram showing a configuration example in which the advance notification information is displayed in gradation.

DETAILED DESCRIPTION OF EMBODIMENTS

Configuration Example of Information Processing System 1

Figure 1:
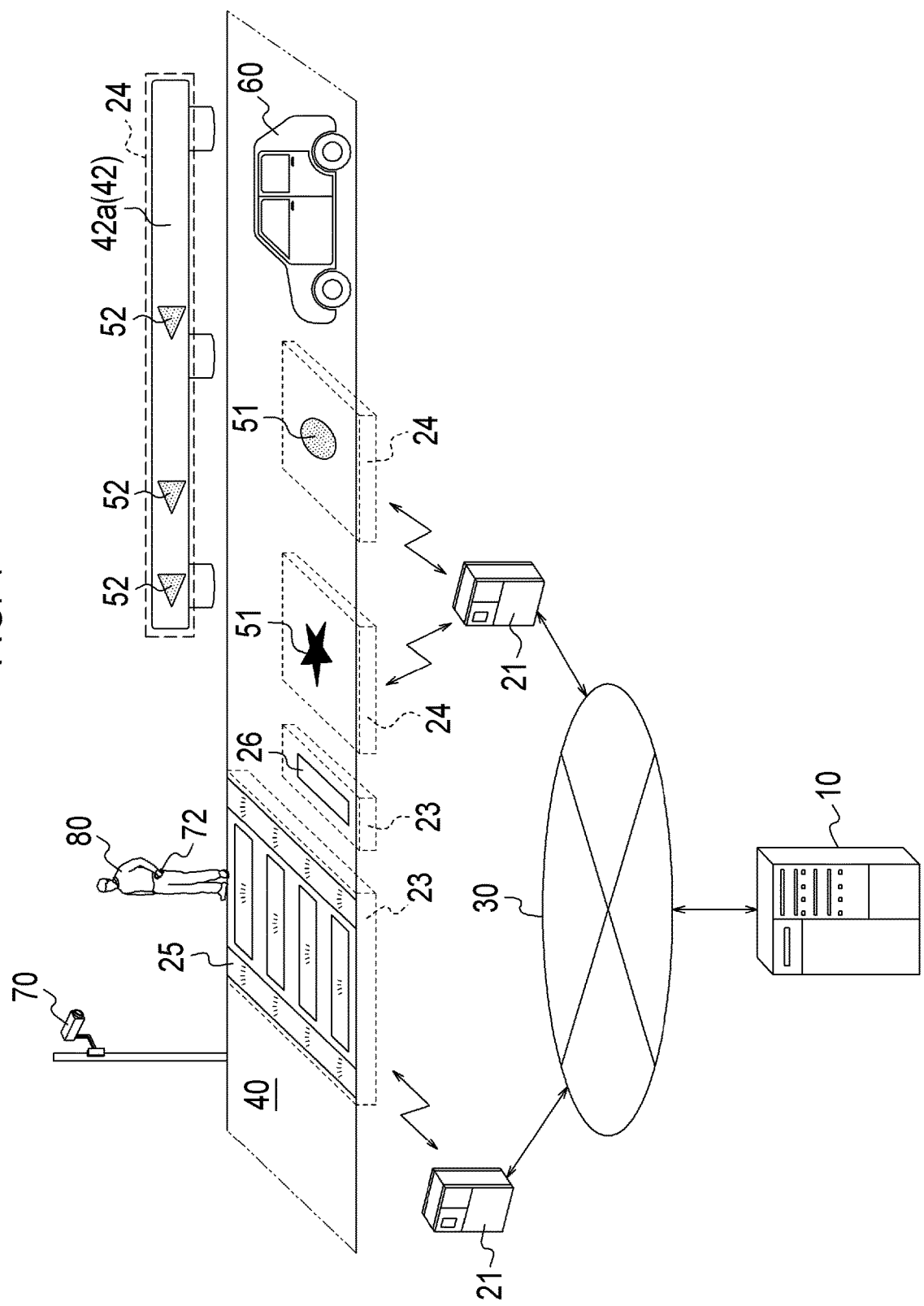
FIG. 1 is a schematic diagram showing a configuration example of an information processing system according to an embodiment.
Figure 2:
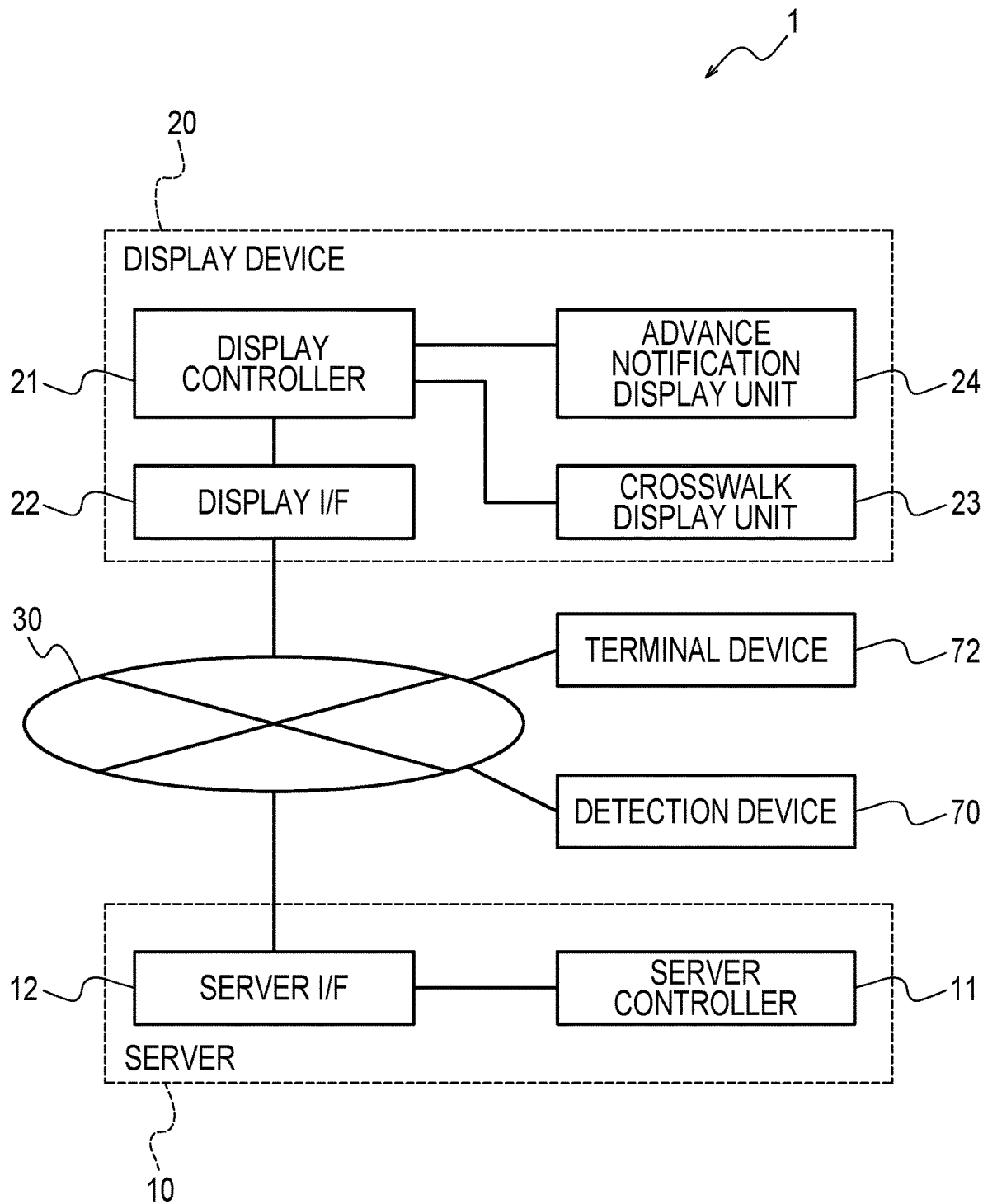
FIG. 2 is a block diagram showing the configuration example of the information processing system according to an embodiment.

As shown in FIGS. 1 and 2, an information processing system 1 according to an embodiment includes a server 10 and a display device 20. The display device 20 is configured to display a crosswalk 25 on a road 40 on which a vehicle 60 travels. The display device 20 is configured to display information that makes advance notification of the display of the crosswalk 25 on the road 40 or a road structure 42 located around the road 40. The information that makes advance notification of the display of the crosswalk 25 is also referred to as advance notification information. The server 10 outputs information regarding a position or timing for displaying the crosswalk 25 on the display device 20 and information for displaying the advance notification information. That is, the information processing system 1 controls the display of the crosswalk 25 on the road 40 and the display of the advance notification information. Hereinafter, a configuration example of the information processing system 1 will be described.

Server 10

The server 10 includes a server controller 11 and a server interface 12. The server interface 12 is also referred to as a server I/F 12.

The server controller 11 controls each component of the server 10. The server controller 11 is also simply referred to as a controller. The server controller 11 may be configured to include one or more processors. In the present embodiment, the "processor" is a general-purpose processor, a dedicated processor specialized for specific processing, and the like, but is not limited to these processors. The server controller 11 may be configured to include one or more dedicated circuits. The dedicated circuit may include, for example, a field-programmable gate array (FPGA) or an application specific integrated circuit (ASIC). The server controller 11 may be configured to include the dedicated circuit instead of the processor or may be configured to include the dedicated circuit together with the processor.

The server 10 may further include a storage unit. The storage unit is, for example, a semiconductor memory, a magnetic memory, or an optical memory, but is not limited thereto. The storage unit may function as, for example, a main storage device, an auxiliary storage device, or a cache memory. The storage unit may include an electromagnetic storage medium, such as a magnetic disk. The storage unit stores predetermined information used for an operation of the server 10. For example, the storage unit may store a system program, an application program, or the like. The storage unit may be included in the server controller 11.

The server I/F 12 outputs information, data, or the like from the server controller 11 or inputs information, data, or the like to the server controller 11. The server I/F 12 is also simply referred to as an interface or I/F.

The server I/F 12 may include a communication module configured to be communicable with the display device 20 and the like through a network 30. The communication module may include the communication module corresponding to a mobile communication standard, such as 4th generation (4G) or 5th generation (5G), but is not limited thereto. The server I/F 12 may be configured to be connectable to the communication module.

The server 10 may include one or a plurality of server devices capable of communicating with each other. The server 10 is also referred to as an information processing device.

Display Device 20

The display device 20 includes a display controller 21, a display interface 22, a crosswalk display unit 23, and an advance notification display unit 24. The display interface 22 is also referred to as a display I/F 22.

The display controller 21 controls each component of the display device 20. The display controller 21 is also simply referred to as a controller. The display controller 21 may be configured to be the same as or similar to the server controller 11 of the server 10. The display controller 21 may be configured to include one or more processors. The display controller 21 may be configured to include one or more dedicated circuits. The dedicated circuit may include, for example, an FPGA or an ASIC. The display controller 21 may be configured to include the dedicated circuit instead of the processor or may be configured to include the dedicated circuit together with the processor.

The display device 20 may further include a storage unit. The storage unit of the display device 20 may be configured to be the same as or similar to the storage unit of the server 10. The storage unit is, for example, a semiconductor memory, a magnetic memory, or an optical memory, but is not limited thereto. The storage unit may function as, for example, a main storage device, an auxiliary storage device, or a cache memory. The storage unit may include an electromagnetic storage medium, such as a magnetic disk. The storage unit stores predetermined information used for an operation of the display device 20. For example, the storage unit may store a system program, an application program, or the like. The storage unit may be included in the display controller 21.

The display I/F 22 outputs information, data, or the like from the display controller 21 or inputs information, data, or the like to the display controller 21. The display I/F 22 is also simply referred to as an interface or I/F.

The display I/F 22 may be configured to be the same as or similar to the server I/F 12. The display I/F 22 may include a communication module configured to be communicable with the server 10 and the like through the network 30. The communication module may include the communication module corresponding to the mobile communication standard, such as 4G or 5G, but is not limited thereto. The display I/F 22 may be configured to be connectable to the communication module.

The crosswalk display unit 23 is configured to display the crosswalk 25 on a road surface of the road 40. The crosswalk display unit 23 may be configured to include a light source installed to be embedded in the road surface of the road 40, for example, as shown in FIG. 1. The light source may be configured to include a light emitting element, such as a light emission diode (LED) or a laser diode (LD). The light source may be configured to include, for example, a light bulb or a fluorescent lamp. A mode in which the light source is installed on the road 40 is not limited to the example of FIG. 1.

The crosswalk display unit 23 may be configured to further include a diffusion plate that diffuses light emitted from the light source such that a driver of the vehicle 60 traveling on the road 40 or a pedestrian 80 crossing the road 40 easily and visually recognizes the light emitted from the light source.

The advance notification display unit 24 may be configured to display the advance notification information on the road surface of the road 40. The advance notification display unit 24 may be configured to display the advance notification information on the road structure 42, such as a guardrail 42a, located on a side of the road 40. The road structure 42 is not limited to the guardrail 42a and may include various structures, such as a side wall 42b, a roadside band, or a medial strip. In FIG. 1, the advance notification display unit 24 displays the advance notification information on the road surface of the road 40 as a road surface display mark 51 and displays the advance notification information on the guardrail 42a as a side surface display mark 52. The advance notification display unit 24 may be configured to include a light source set to be embedded in the road surface of the road 40 in the same or similar manner as the crosswalk display unit 23. The advance notification display unit 24 may be configured to include a light source installed in the road structure 42. The advance notification display unit 24 may be configured to further include a diffusion plate that diffuses light emitted from the light source such that the driver of the vehicle 60 easily and visually recognizes the light emitted from the light source.

The number of display devices 20 included in the information processing system 1 is not limited to one and may be two or more. The information processing system 1 may include the display device 20 having both the crosswalk display unit 23 and the advance notification display unit 24. The information processing system 1 may include the display device 20 having the crosswalk display unit 23 and not having the advance notification display unit 24. The information processing system 1 may include the display device 20 having the advance notification display unit 24 and not having the crosswalk display unit 23.

Configuration to Detect Pedestrian 80

The information processing system 1 may display the crosswalk 25 on the road 40 when the pedestrian 80 who may cross the road 40 is present. The information processing system 1 may detect the pedestrian 80 located within a predetermined distance from the road 40 and determine whether the detected pedestrian 80 may cross the road 40.

The information processing system 1 further includes a detection device 70, although it is not requested, as a configuration of detecting the pedestrian 80 located within the predetermined distance from the road 40. The detection device 70 may be configured to include a sensor capable of detecting the presence of the pedestrian 80, such as a camera or a motion sensor. The detection device 70 may be installed, for example, near the road 40. The detection device 70 may be configured to detect a walking speed, a position, or the like of the pedestrian 80. The walking speed, the position, or the like of the pedestrian 80 is also collectively referred to as a state of the pedestrian 80.

The detection device 70 may output the detection result of the pedestrian 80 to the server 10 through the network 30. The detection device 70 may output the detection result of the pedestrian 80 to the server 10 by, for example, short-range communication or the like, without going through the network 30. The detection result of the pedestrian 80 includes the detection result that the pedestrian 80 is located within the predetermined distance from the road 40. The detection result of the pedestrian 80 may further include the detection result of the state of the pedestrian 80. The server 10 may determine whether the pedestrian 80 who may cross the road 40 is present based on the detection result of the pedestrian 80. The server 10 may calculate the number of pedestrians 80 that may cross the road 40.

The information processing system 1 further includes a terminal device 72 as a configuration of detecting the pedestrian 80 located within the predetermined distance from the road 40, although it is not requested. The terminal device 72 is assumed to be possessed by the pedestrian 80. The terminal device 72 may include, for example, a receiver corresponding to a satellite positioning system such that position information of the pedestrian 80 can be detected. The receiver corresponding to the satellite positioning system may include, for example, a global positioning system (GPS) receiver.

The terminal device 72 may output the position information of the pedestrian 80 to the server 10 through the network 30. The terminal device 72 may output the position information of the pedestrian 80 to the server 10 by, for example, short-range communication or the like, without going through the network 30. The server 10 detects the pedestrian 80 located within the predetermined distance from the road 40 based on the position information of the pedestrian 80. The server 10 determines whether the detected pedestrian 80 may cross the road 40. The server 10 may calculate the number of pedestrians 80 that may cross the road 40.

The detection device 70 or the terminal device 72 may detect the pedestrian 80 who may cross the road 40 and output the detection result to the server 10. The detection device 70 or the terminal device 72 may calculate the number of pedestrians 80 who may cross the road 40 and further output the calculation result to the server 10.

Operation Example of Information Processing System 1

The information processing system 1 displays the crosswalk 25 on the road 40 such that the pedestrian 80 can cross the road 40, for example, with an operation as described below. The information processing system 1 displays the advance notification information before displaying the crosswalk 25. With the display of the advance notification information, the crosswalk 25 may be displayed so as not to affect the driver of the vehicle 60 traveling on the road 40.

The server controller 11 of the server 10 controls the display device 20 to display the crosswalk 25 on the road 40 on which the vehicle 60 travels. That is, the server controller 11 controls the display of the crosswalk 25 on the road 40 on which the vehicle 60 travels. The server controller 11 may generate control information of the display device 20 to display the crosswalk 25 on the display device 20 and output the control information to the display device 20. The display device 20 may display the crosswalk 25 on the road 40 by the crosswalk display unit 23 based on the control information.

The server controller 11 decides a position or timing at which the crosswalk 25 is displayed. The server controller 11 may decide the position or timing at which the crosswalk 25 is displayed based on the state of the pedestrian 80 crossing the road 40. For example, the server controller 11 may detect an action of the pedestrian 80 approaching the road 40, estimate a position where the pedestrian 80 crosses the road 40, and decide the position where the crosswalk 25 is displayed based on the estimation result. The server controller 11 may estimate a timing at which the pedestrian 80 starts crossing the road 40 based on the walking speed of the pedestrian 80 and decide the timing at which the crosswalk 25 is displayed based on the estimation result.

The server controller 11 may calculate a probability that the pedestrian 80 crosses the road 40 based on the state of the pedestrian 80 walking beside the road 40. The probability that the pedestrian 80 crosses the road 40 is also referred to as a crossing probability. For example, the server controller 11 may estimate behavior of the pedestrian 80, calculate a probability of the behavior, and calculate a probability of behavior of crossing the road 40 among the behavior of the pedestrian 80 as the crossing probability. For example, the server controller 11 may calculate the crossing probability with a higher value as a distance from the road 40 to the position of the pedestrian 80 is shorter.

The server controller 11 may estimate whether the pedestrian 80 has an intention to cross the road 40 and calculate the crossing probability. Specifically, the server controller 11 may determine whether the pedestrian 80 has the intention to cross the road 40 based on a movement of the pedestrian 80. For example, when a movement of staying on the side of the road 40 for a predetermined time or more or watching the vehicle 60 traveling on the road 40 is detected as the movement of the pedestrian 80, the server controller 11 may determine that the pedestrian 80 has the intention to cross the road 40. When determination is made that the pedestrian 80 has the intention to cross the road 40, the server controller 11 may calculate the crossing probability with a high value.

Display Example of Advance Notification Information

The server controller 11 may output the control information to the advance notification display unit 24 such that the road surface display mark 51 is displayed on the road surface of the road 40 as exemplified in FIG. 1. The server controller 11 may generate the control information of the advance notification display unit 24 such that the side surface display mark 52 is displayed on the road structure 42, such as the guardrail 42a, as exemplified in FIG. 1 and output the control information to the advance notification display unit 24.

Figure 3:
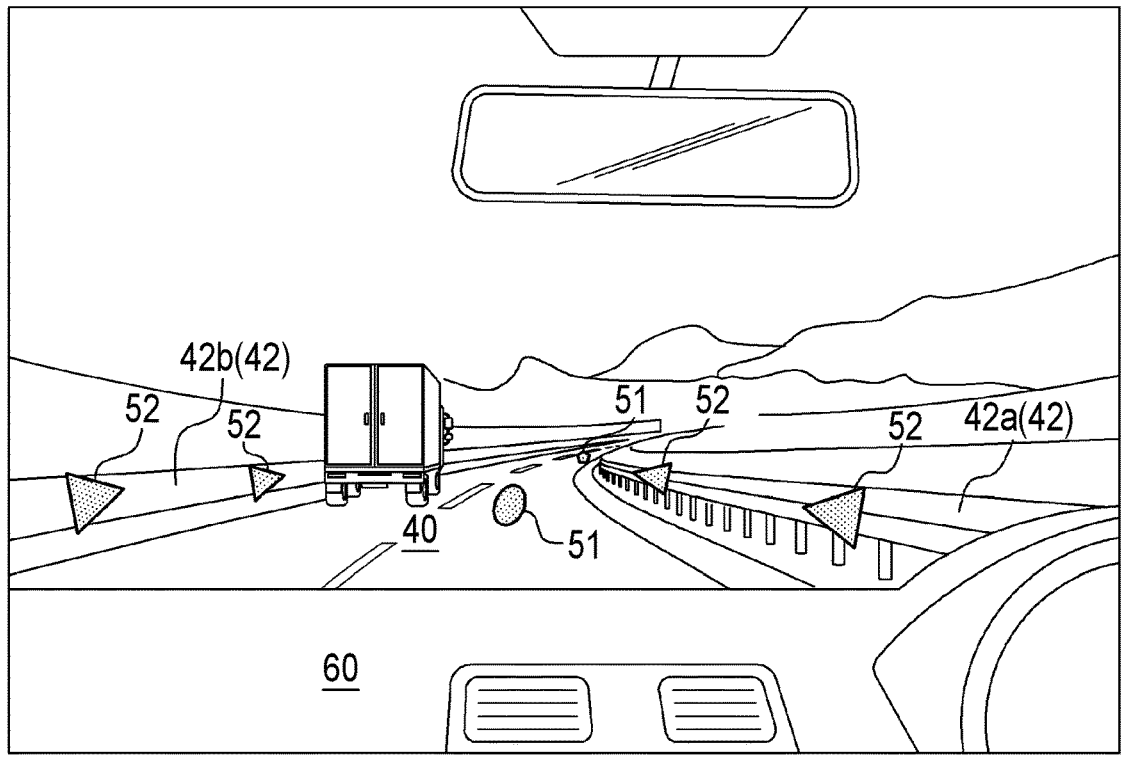
FIG. 3 is a diagram showing an example of a display mode of advance notification information as viewed from a vehicle driver.

The advance notification display unit 24 displays the advance notification information such that the driver of the vehicle 60 visually recognizes the advance notification information. The driver of the vehicle 60 visually recognizes the advance notification information as exemplified in FIG. 3. The driver of the vehicle 60 can visually recognize the road surface display mark 51 displayed on the road surface of the road 40. In the example of FIG. 3, the driver of the vehicle 60 can visually recognize a circular road surface display mark 51 at a near position and a star-shaped road surface display mark 51 at a distant position. The driver of the vehicle 60 can visually recognize the side surface display mark 52 displayed on the road structure 42 including the guardrail 42a and the side wall 42b. In the example of FIG. 3, the driver of the vehicle 60 can visually recognize a triangle with an apex that faces toward an advancing direction of the vehicle 60 as the side surface display mark 52. A display mode of the advance notification information is not limited to these examples and may include various other modes. The display mode of the advance notification information may be continuously changed or discretely changed according to a distance from a display position of the crosswalk 25.

Display Based on Distance from Display Position of Crosswalk 25

The server controller 11 may set the display mode of the advance notification information differently based on the distance from the advance notification display unit 24 to the display position of the crosswalk 25. The distance from the advance notification display unit 24 to the display position of the crosswalk 25 is also referred to as an advance notification distance. Specifically, the server controller 11 calculates a distance between a position where the advance notification display unit 24 that displays the advance notification information is installed and the display position of the crosswalk 25, as the advance notification distance. The server controller 11 decides whether to display the advance notification information on each advance notification display unit 24 based on the advance notification distance. The server controller 11 decides a mode in which the advance notification display unit 24 is caused to display the advance notification information, which is decided to display the advance notification information, based on the advance notification distance. The server controller 11 generates the control information to display the advance notification information in the decided mode and outputs the control information to the advance notification display unit 24.

The server controller 11 may decide the display mode of the advance notification information such that the advance notification information is displayed in a conspicuous manner to the driver of the vehicle 60 as the advance notification distance is shorter and generate the control information. For example, as shown in FIG. 1, the server controller 11 may decide the advance notification information to be displayed at a distant position from the display position of the crosswalk 25 as the circular road surface display mark 51 and decide the advance notification information to be displayed at a near position from the display position of the crosswalk 25 as the star-shaped road surface display mark 51. The server controller 11 may decide the advance notification information to be displayed on the advance notification display unit 24 as a larger mark as the advance notification distance is shorter. The server controller 11 may finely change the display mode of the advance notification information according to the advance notification distance when the display mode of the advance notification information can be changed continuously or discretely.

Display Based on Speed of Vehicle 60

The server controller 11 may set the display mode of the advance notification information differently further based on a speed of the vehicle 60 traveling toward the display position of the crosswalk 25. Specifically, the server controller 11 acquires the speed of the vehicle 60. The server controller 11 may communicate with the vehicle 60 to acquire the speed of the vehicle 60 or may acquire the speed of the vehicle 60 detected by the detection device 70 or the like installed on the road 40. The server controller 11 may decide the display mode of the advance notification information in each advance notification display unit 24 such that the driver of the vehicle 60 is easier to notice the advance notification information as the speed of the vehicle 60 is faster.

The server controller 11 may decide the mode in which the advance notification display unit 24 is caused to display the advance notification information based on the distance from the advance notification display unit 24 to the display position of the crosswalk 25 and then change the mode based on the speed of the vehicle 60. For example, the server controller 11 may change the display mode of the advance notification information to a more conspicuous mode when the speed of the vehicle 60 is equal to or greater than a predetermined speed. The server controller 11 may finely change the display mode of the advance notification information according to the speed of the vehicle 60 when the display mode of the advance notification information can be changed continuously or discretely.

The server controller 11 may calculate a time requested for the vehicle 60 to reach the display position of the crosswalk 25 after passing through the advance notification display unit 24, based on the advance notification distance and the speed of the vehicle 60. The time requested for the vehicle 60 to reach the display position of the crosswalk 25 after passing through the advance notification display unit 24 is also referred to as a reaching time. The server controller 11 may decide the display mode of the advance notification information based on the reaching time. For example, the server controller 11 may decide the display mode of the advance notification information in each advance notification display unit 24 such that the driver of the vehicle 60 is easier to notice the advance notification information as the reaching time is shorter.

Display Based on Probability of Displaying Crosswalk 25

The server controller 11 may set the display mode of the advance notification information differently further based on the probability that the crosswalk 25 is actually displayed at the display position. The probability that the crosswalk 25 is actually displayed at the display position is also referred to as a display probability. Specifically, the server controller 11 may calculate the display probability when whether to display the crosswalk 25 is decided. The server controller 11 may calculate the display probability at a specific position on the road 40. The server controller 11 may calculate the display probability at each of a plurality of positions on the road 40 and generate display probability distribution on the road 40. The server controller 11 may decide the display mode of the advance notification information in each advance notification display unit 24 such that the driver of the vehicle 60 is easier to notice the advance notification information as the display probability is higher.

The server controller 11 may decide the mode in which the advance notification display unit 24 is caused to display the advance notification information based on the distance from the advance notification display unit 24 to the display position of the crosswalk 25 and then change the mode based on the speed of the vehicle 60. For example, the server controller 11 may change the display mode of the advance notification information to a more conspicuous mode when the speed of the vehicle 60 is equal to or greater than a predetermined speed. The server controller 11 may finely change the display mode of the advance notification information according to the speed of the vehicle 60 when the display mode of the advance notification information can be changed continuously or discretely.

The server controller 11 may confirm that the crosswalk 25 is displayed when the display probability is equal to or greater than a predetermined value, such as 100% or 90%. The server controller 11 may set the display mode of the advance notification information differently between when the display of the crosswalk 25 is confirmed and the display of the crosswalk 25 is not confirmed. For example, the server controller 11 may display the advance notification information in yellow when the display of the crosswalk 25 is not confirmed and may display the advance notification information in red when the display of the crosswalk 25 is confirmed. The server controller 11 may set a shape of the mark to be displayed as the advance notification information differently between when the display of the crosswalk 25 is not confirmed and confirmed.

Display on Preceding Vehicle 62

Figure 4:
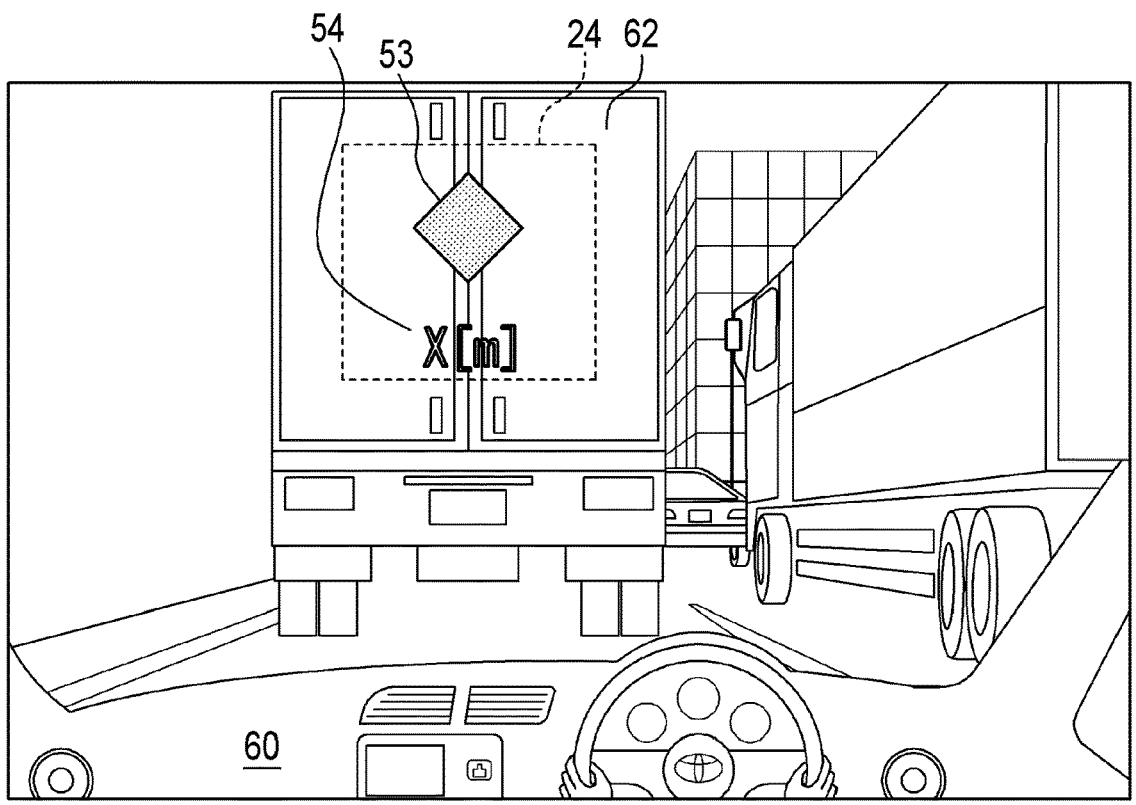
FIG. 4 is a diagram showing a configuration example for displaying the advance notification information on a preceding vehicle.

As exemplified in FIG. 4, when a preceding vehicle 62 traveling in front of the vehicle 60 is present, the server controller 11 may display the advance notification information on the preceding vehicle 62. For example, when the preceding vehicle 62 is a large vehicle, such as a truck, the advance notification display unit 24 may be installed on a rear surface of the preceding vehicle 62. The server controller 11 may display the advance notification information on the advance notification display unit 24 on the rear surface of the preceding vehicle 62. The server controller 11 may display a vehicle display mark 53 on the advance notification display unit 24 as the advance notification information. The vehicle display mark 53 may be the same or similar to the road surface display mark 51 or the side surface display mark 52, or may be a mark different from the road surface display mark 51 or the side surface display mark 52. The server controller 11 may display, on the advance notification display unit 24, character information 54 that numerically displays the distance to the display position of the crosswalk 25 as the advance notification information.

The server controller 11 may display the advance notification information on the advance notification display unit 24 of the preceding vehicle 62 when the preceding vehicle 62 travels within a predetermined distance from the vehicle 60. The server controller 11 may display the advance notification information on the advance notification display unit 24 of the preceding vehicle 62 when the preceding vehicle 62 is present on the road surface of the road 40 for which the advance notification information is to be displayed. With the display of the advance notification information on the advance notification display unit 24 of the preceding vehicle 62, the driver of the vehicle 60 is easier to notice the advance notification information.

Display of Stop Position

The server controller 11 may display a stop line 26 together with the crosswalk 25 as shown in FIG. 1. In the present embodiment, the crosswalk display unit 23 displays the stop line 26. When the crosswalk 25 is displayed on the road 40, the server controller 11 decides the stop position before the crosswalk 25 of the vehicle 60 traveling before the display position of the crosswalk 25. The server controller 11 may display the stop line 26 on the road surface of the road 40 on which the vehicle 60 travels as information indicating the calculated stop position. The server controller 11 may display the information indicating the stop position in various other forms, not limited to the exemplified stop line 26.

The server controller 11 may calculate the number of vehicles 60 that stops before the display position of the crosswalk 25 when a plurality of the vehicles 60 travels before the display position of the crosswalk 25. The server controller 11 may calculate what number each vehicle 60 stops before the display position of the crosswalk 25. The server controller 11 may decide the stop position of each vehicle 60 based on the number of other vehicles 60 that stops in front of each vehicle 60. The server controller 11 may display the stop position of each vehicle 60 on, for example, the display device 20 mounted on each vehicle 60 so as not to be viewed by the vehicle 60 that is not a target of the stop position.

Example of Procedure That Displays Advance Notification Information

Figure 5:
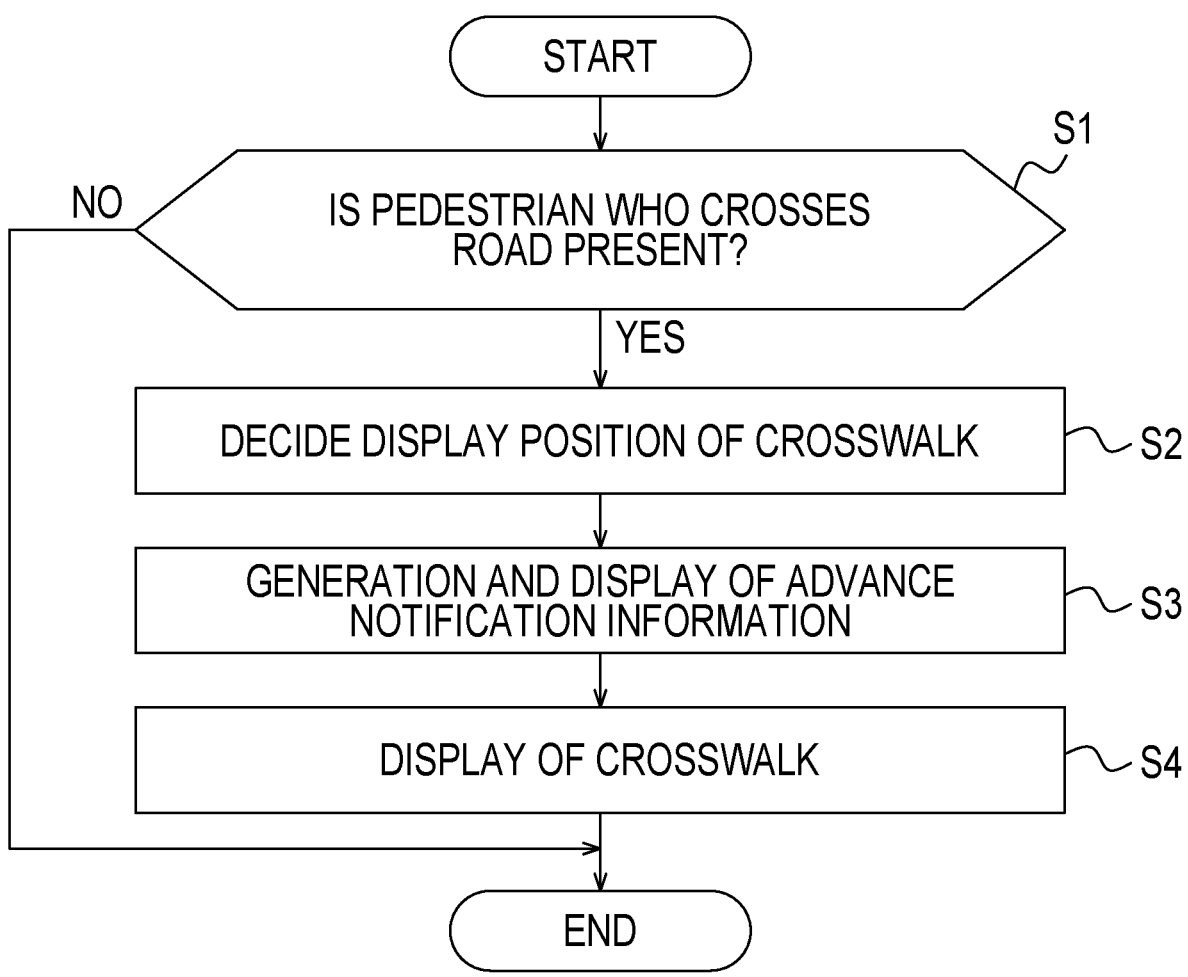
FIG. 5 is a flowchart showing an example of a procedure that displays the advance notification information.

The server controller 11 may execute an information processing method including a procedure of a flowchart exemplified in FIG. 5 in order to display the advance notification information. The information processing method may be realized as an information processing program executed by a processor constituting the server controller 11.

The server controller 11 determines whether the pedestrian 80 who may cross the road 40 is present (step S1). Specifically, the server controller 11 may detect the pedestrian 80 who may cross the road 40 based on the information acquired from the detection device 70 or the terminal device 72. When there is no pedestrian 80 who may cross the road 40 (step S1: NO), the server controller 11 ends the execution of the procedure shown in the flowchart of FIG. 5.

When the pedestrian 80 who may cross the road 40 is present (step S1: YES), the server controller 11 decides the display position of the crosswalk 25 (step S2). The server controller 11 generates the advance notification information to be visually recognized by the driver of the vehicle 60 traveling on the road 40 displaying the crosswalk 25 based on the display position of the crosswalk 25, and causes the advance notification display unit 24 to display the advance notification information (step S3). Specifically, the server controller 11 may generate the advance notification information to be displayed on the advance notification display unit 24 based on the advance notification distance. The server controller 11 may generate the advance notification information to be displayed on the advance notification display unit 24 further based on the speed of the vehicle 60.

After displaying the advance notification information, the server controller 11 causes the crosswalk display unit 23 to display the crosswalk 25 (step S4). Specifically, the server controller 11 may display the crosswalk 25 after a lapse of a predetermined time after displaying the advance notification information. The server controller 11 may display the crosswalk 25 when the driver of the vehicle 60 recognizes the advance notification information after displaying the advance notification information. After executing the procedure in step S4, the server controller 11 ends the execution of the procedure shown in the flowchart of FIG. 5.

Figure 6:
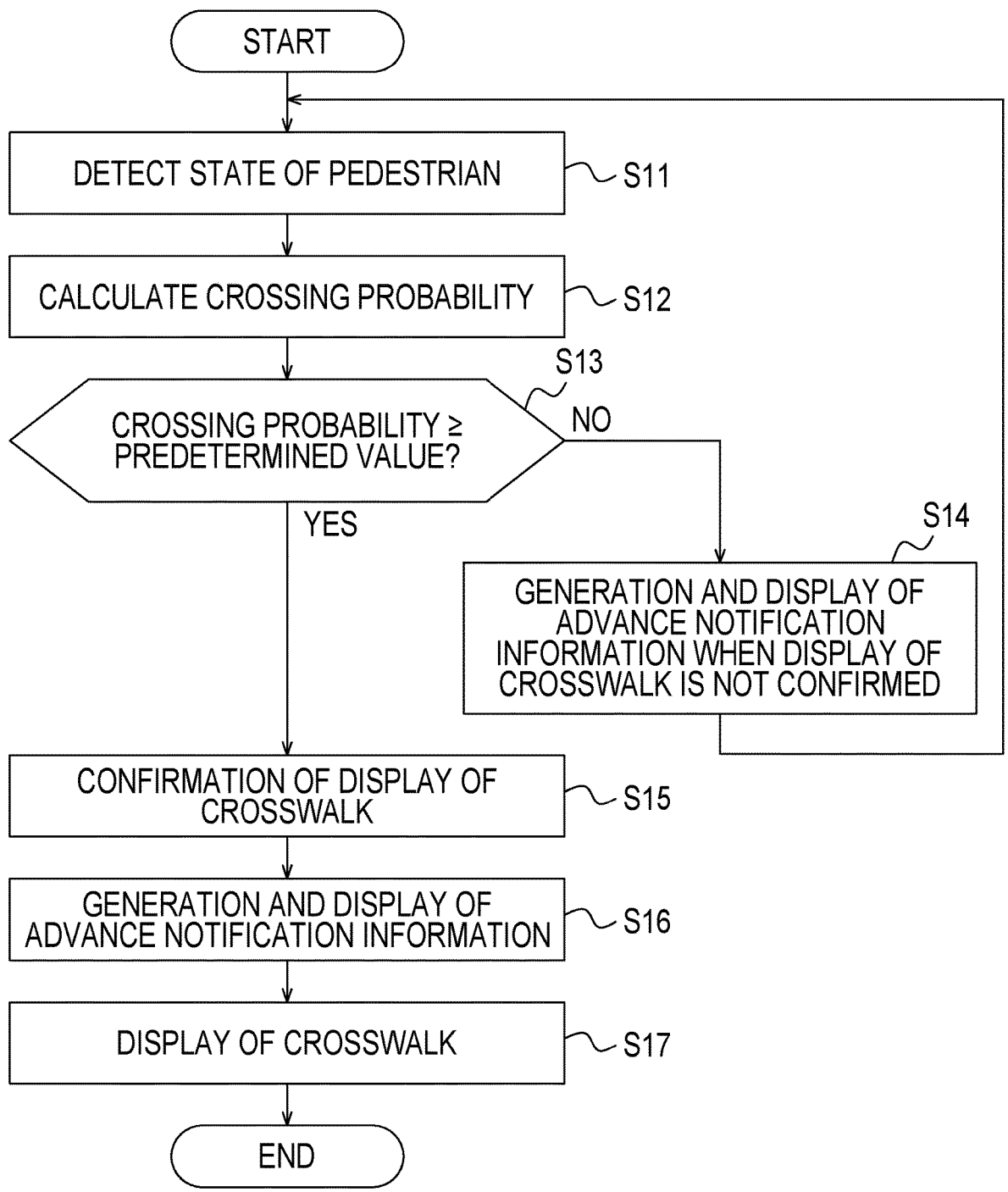
FIG. 6 is a flowchart showing an example of a procedure that displays the advance notification information based on a crossing probability.

The server controller 11 may execute the information processing method including the procedure of the flowchart exemplified in FIG. 6 such that the advance notification information is displayed based on the probability of displaying the crosswalk 25 even when whether to display the crosswalk 25 is not confirmed.

The server controller 11 acquires the state of the pedestrian 80 who may cross the road 40 (step S11). Specifically, the server controller 11 may detect the walking speed, the position, or the like of the pedestrian 80 who may cross the road 40 as the state of the pedestrian 80 based on the information acquired from the detection device 70 or the terminal device 72. The server controller 11 calculates the probability that the pedestrian 80 crosses the road 40 based on the state of the pedestrian 80 who may cross the road 40 (step S12). The probability that the pedestrian 80 crosses the road 40 is also referred to as the crossing probability. The crossing probability corresponds to the probability that the server controller 11 displays the crosswalk 25.

The server controller 11 determines whether the crossing probability is equal to or greater than a predetermined value (step S13). When the crossing probability is not equal to or greater than the predetermined value (step S13: NO), that is, when the crossing probability is less than the predetermined value, the server controller 11 generates the advance notification information when the display of the crosswalk 25 is not confirmed and causes the advance notification display unit 24 to display the advance notification information (step S14). After executing the procedure in step S14, the server controller 11 returns to the procedure in step S11.

When the crossing probability is equal to or greater than the predetermined value (step S13: YES), the server controller 11 confirms to display the crosswalk 25 (step S15). The server controller 11 generates the advance notification information when the display of the crosswalk 25 is confirmed and causes the advance notification display unit 24 to display the advance notification information (step S16). After displaying the advance notification information, the server controller 11 causes the crosswalk display unit 23 to display the crosswalk 25 (step S17). After executing the procedure in step S17, the server controller 11 ends the execution of the procedure shown in the flowchart of FIG. 6.

Figure 7:
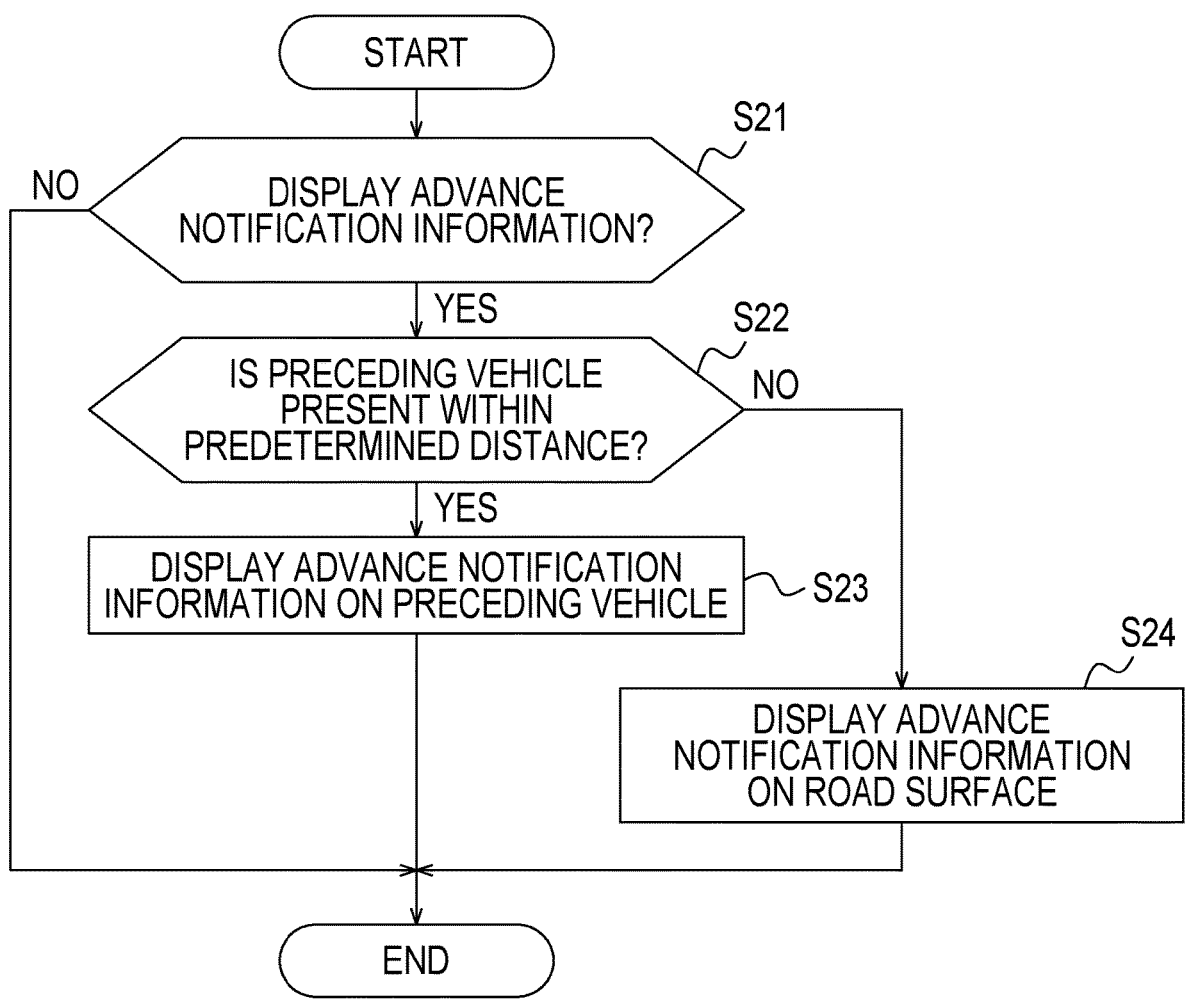
FIG. 7 is a flowchart showing an example of a procedure that displays the advance notification information on the preceding vehicle.

The server controller 11 may execute the information processing method including the procedure of the flowchart exemplified in FIG. 7 to decide whether to display the advance notification information on the road surface of the road 40 or on the preceding vehicle 62.

The server controller 11 determines whether to display the advance notification information (step S21). When the advance notification information is not displayed (step S21: NO), the server controller 11 ends the execution of the procedure shown in the flowchart of FIG. 7. When the advance notification information is displayed (step 21: YES), the server controller 11 determines whether the preceding vehicle 62 is present within the predetermined distance in front of the vehicle 60 (step S22). When the preceding vehicle 62 is present (step S22: YES), the server controller 11 causes the advance notification display unit 24 of the preceding vehicle 62 to display the advance notification information (step S23). When the preceding vehicle 62 is not present (step S22: NO), the server controller 11 displays the advance notification information on the road surface of the road 40 (step S24). After executing step S23 or S24, the server controller 11 ends the execution of the procedure shown in the flowchart of FIG. 7.

Figure 8:
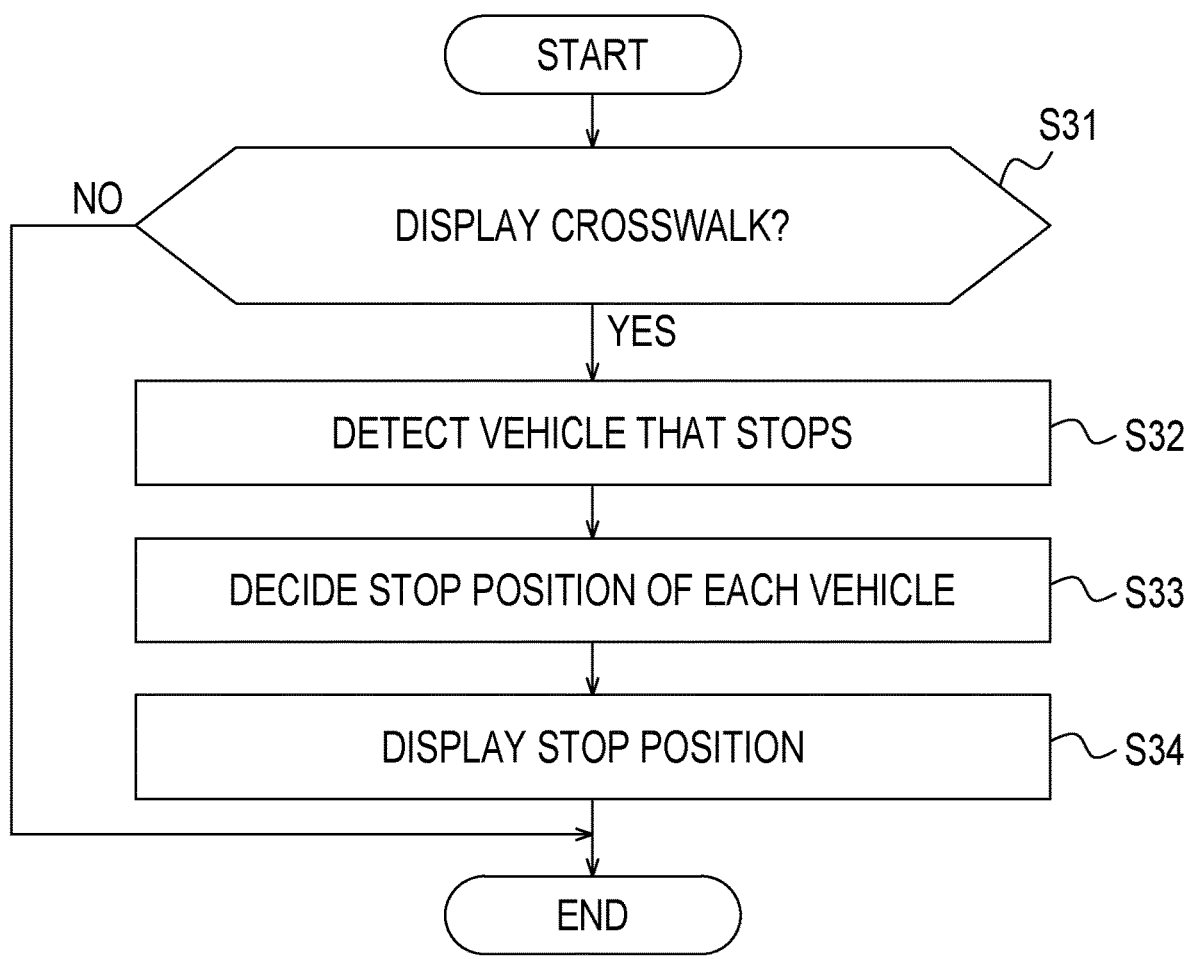
FIG. 8 is a flowchart showing an example of a procedure that displays information regarding a stop position.

The server controller 11 may execute the information processing method including the procedure of the flowchart illustrated in FIG. 8 to display the stop position of the vehicle 60 before the display position of the crosswalk 25.

The server controller 11 determines whether to display the crosswalk 25 (step S31). When the crosswalk 25 is not displayed (step S31: NO), the server controller 11 ends the execution of the procedure shown in the flowchart of FIG. 8. When the crosswalk 25 is displayed (step S31: YES), the server controller 11 detects the vehicle 60 that stops before the display position of the crosswalk 25 (step S32). The server controller 11 decides the stop position of each vehicle 60 before the display position of the crosswalk 25 (step S33). The server controller 11 causes the crosswalk display unit 23 to display information representing the stop position of each vehicle 60 (step S34). After executing the procedure in step S34, the server controller 11 ends the execution of the procedure shown in the flowchart of FIG. 8.

Summary

As described above, the information processing system 1 according to the present embodiment can display the advance notification information so as to cause the driver of the vehicle 60 to visually recognize the information when the crosswalk 25 is displayed on the road 40 on which the vehicle 60 travels. By doing so, it is possible to avoid a situation in which the crosswalk 25 is suddenly displayed when viewed from the driver of the vehicle 60. As a result, the possibility that the display of the crosswalk 25 hinders the driving of the vehicle 60 may be reduced.

Other Embodiments

The information processing system 1 is not limited to the above aspects and may be realized in various other aspects. Hereinafter, other embodiments will be described.

Gradation Display of Advance Notification Information

The server controller 11 may display the advance notification information on the road surface of the road 40 or the road structure 42 in a band-shaped mode having gradation. As shown in FIG. 9, for example, the advance notification information may be displayed on the guardrail 42a in the band-shaped mode having gradation that becomes darker as the vehicle approaches the display position of the crosswalk 25. The server controller 11 may display the advance notification information in a darker color as the advance notification distance is shorter. Specifically, the server controller 11 may decide the advance notification information to be displayed at a distant position from the display position of the crosswalk 25 as a light-colored mark and decide the advance notification information to be displayed at a near position from the display position of the crosswalk 25 in a dark-colored mark.

The server controller 11 may decide a display color of the advance notification information as a color in which a shade of the primary color, such as red, blue, or green, is changed according to the advance notification distance. The server controller 11 may change a color of the display color of the advance notification information according to the advance notification distance. Specifically, the server controller 11 may decide the display color of the advance notification information as a blue system when the advance notification distance is long and decide the display color of the advance notification information as a warning color of a red system or a caution color of a yellow system when the advance notification distance is short.

As described above, with the display of the advance notification information in a mode that the driver can easily notice as the vehicle approaches the display position of the crosswalk 25, the driver of the vehicle 60 is easy to predict that the crosswalk 25 is displayed. As a result, the influence of the display of the crosswalk 25 on the driving may be reduced.

Configuration Example in which Display Device 20 is Mounted on Vehicle 60

At least a part of the display device 20 may be mounted on the vehicle 60. For example, the vehicle 60 may include the crosswalk display unit 23 or the advance notification display unit 24. When the advance notification display unit 24 is mounted on the vehicle 60, the advance notification display unit 24 may display the advance notification information as a virtual image such that the advance notification information is superimposed on at least one of the road surface of the road 40 and the road structure 42. When the crosswalk display unit 23 is mounted on the vehicle 60, the crosswalk display unit 23 may display the crosswalk 25 or the stop line 26 as a virtual image such that the crosswalk 25 or the stop line 26 is superimposed on the road surface of the road 40. The crosswalk display unit 23 or the advance notification display unit 24 mounted on the vehicle 60 may be configured as, for example, a head up display (HUD). In the information processing system 1, with the display of the advance notification information by the advance notification display unit 24 mounted on the vehicle 60 to cause the driver to visually recognize the advance notification information, the advance notification information can be displayed to the driver of each vehicle 60 in a different mode. With the display of the advance notification information to the driver of each vehicle 60 in a different mode, the advance notification information can be displayed in a mode in which the driver of each vehicle 60 is easy to visually recognize the advance notification information. As a result, the influence of the display of the crosswalk 25 on the driving may be reduced.

Integration of Server 10 and Display Device 20

The function described above in which the server 10 controls the display of the crosswalk 25 may be realized by the display device 20. That is, the server 10 and the display device 20 may be integrated. In this case, the display device 20 may detect the pedestrian 80 who may cross the road 40 based on the detection result acquired from the terminal device 72 or the detection device 70, without acquiring the information from the server 10, to control the display of the crosswalk 25. The display controller 21 of the display device 20 outputs the information for displaying the crosswalk 25 to the crosswalk display unit 23.

Although the embodiments according to the present disclosure have been described based on the drawings and examples, it should be noted that those skilled in the art can make various modifications and changes based on the present disclosure. It should be noted, therefore, that these modifications and changes are within the scope of the present disclosure. For example, the functions and the like included in each means or each step and the like can be disposed again so as not to be logically inconsistent, and a plurality of means or steps and the like can be combined into one or divided.

What is claimed is:

1. An information processing device comprising a controller configured to control display of a crosswalk on a road on which a vehicle travels, wherein
   the controller outputs information to be displayed on a display device such that a driver of the vehicle visually recognizes advance notification information that makes advance notification of the display of the crosswalk,
   the controller displays the advance notification information on at least one of a road surface on which the vehicle travels and a road structure located on a side of the road on which the vehicle travels, and
   when a preceding vehicle traveling within a predetermined distance in front of the vehicle is present, the controller displays the advance notification information on the preceding vehicle.

2. The information processing device according to claim 1, wherein the controller decides a display mode of the advance notification information based on a distance from the vehicle to a position where the crosswalk is displayed.

3. The information processing device according to claim 2, wherein the controller displays the advance notification information in a darker color as the distance is shorter.

4. The information processing device according to claim 2, wherein the controller displays the advance notification information larger as the distance is shorter.

5. The information processing device according to claim 2, wherein the controller decides the display mode of the advance notification information further based on a speed of the vehicle.

6. The information processing device according to claim 2, wherein the controller decides the display mode of the advance notification information further based on a probability of displaying the crosswalk.

7. The information processing device according to claim 6, wherein the controller decides a display color of the advance notification information based on the probability of displaying the crosswalk.

8. The information processing device according to claim 7, wherein the controller sets the display color of the advance notification information differently between when the display of the crosswalk is confirmed and when the display of the crosswalk is not confirmed.

9. The information processing device according to claim 2, wherein the controller decides the display mode of the advance notification information further based on a time until the crosswalk is displayed.

10. The information processing device according to claim 1, wherein the controller displays the advance notification information as a virtual image such that the advance notification information is superimposed on at least one of the road surface on which the vehicle travels, the road structure located on the side of the road on which the vehicle travels, and a preceding vehicle traveling within a predetermined distance in front of the vehicle, as viewed from the driver of the vehicle.

11. The information processing device according to claim 1, wherein the controller decides a stop position of the vehicle before the crosswalk and displays information indicating the stop position on a road surface on which the vehicle travels.

12. The information processing device according to claim 11, wherein the controller decides the stop position of the vehicle based on the number of other vehicles that stops before the crosswalk.

13. An information processing system comprising:
    the information processing device according to claim 1; and
    the display device.

14. An information processing method that controls display of a crosswalk on a road on which a vehicle travels, the method comprising:
    outputting information to be displayed on a display device such that a driver of the vehicle visually recognizes advance notification information that makes advance notification of the display of the crosswalk;
    displaying the advance notification information on at least one of a road surface on which the vehicle travels and a road structure located on a side of the road on which the vehicle travels; and
    displaying the advance notification information on a preceding vehicle when the preceding vehicle traveling within a predetermined distance in front of the vehicle is present.

15. The information processing method according to claim 14, further comprising deciding a display mode of the advance notification information based on a distance from the vehicle to a position where the crosswalk is displayed.

16. The information processing method according to claim 15, further comprising deciding a display mode of the advance notification information based on a probability of displaying the crosswalk.

17. The information processing method according to claim 14, further comprising:
   calculating a stop position of the vehicle before the crosswalk; and
   displaying information regarding the stop position on a road surface on which the vehicle travels.

18. A vehicle comprising a display device that displays advance notification information that makes advance notification of the display of a crosswalk on a road as a virtual image such that the advance notification information is superimposed on at least one of a road surface of the road and a road structure located on a side of the road, as viewed from a driver, wherein
   when a preceding vehicle traveling within a predetermined distance in front of the vehicle is present, the display device displays the advance notification information on the preceding vehicle.

* * * * *